J. S. SEAMAN.
MACHINE FOR ROUNDING AND STRAIGHTENING RODS.

No. 192,460. Patented June 26, 1877.

Witnesses
Francis L. Clark
Claudius L. Parke

Inventor Joseph S. Seaman
By Attorney George H. Christy.

UNITED STATES PATENT OFFICE.

JOSEPH S. SEAMAN, OF PITTSBURG, PA., ASSIGNOR OF TWO-THIRDS HIS RIGHT TO JAMES B. YOUNG AND ROBERT SLEETH, OF SAME PLACE.

IMPROVEMENT IN MACHINES FOR ROUNDING AND STRAIGHTENING RODS.

Specification forming part of Letters Patent No. 192,460, dated June 26, 1877; application filed November 28, 1876.

*To all whom it may concern:*

Be it known that I, JOSEPH S. SEAMAN, of Pittsburg, county of Allegheny, State of Pennsylvania, have invented or discovered a new and useful Machine for Rounding, Straightening, and Finishing Iron, &c.; and I do hereby declare the following to be a full, clear, concise, and exact description thereof, reference being had to the accompanying drawing making part of this specification, in which—like letters indicating like parts—

Figure 1:
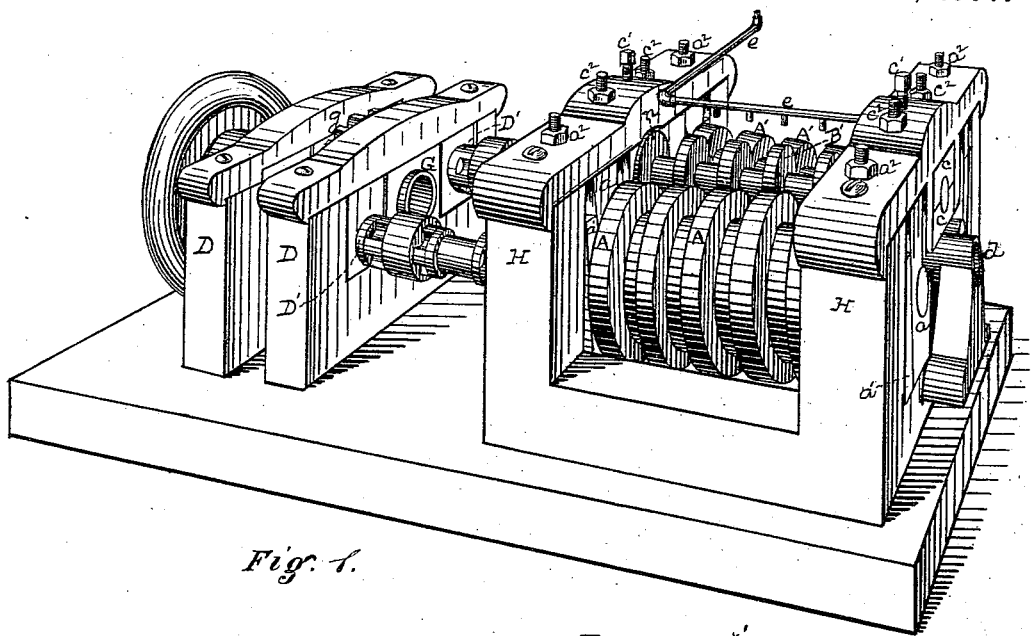
Figure 2:
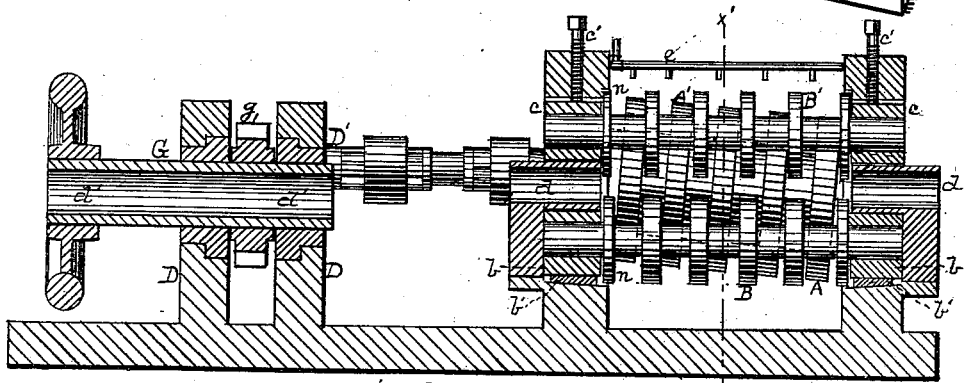
Figure 3:
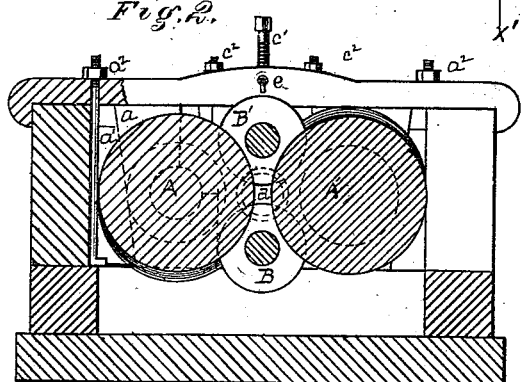

Figure 1 is a perspective view of my improved machine. Fig. 2 is a longitudinal vertical section thereof through the axial line of feed; and Fig. 3 is a transverse vertical section through $x'\ x'$ of Fig. 2.

My present invention relates to certain improvements in the class of machines referred to in patents granted to me October 6, 1874, and December 22, 1874. The rolls A A' are made and operated in either of the ways described in said patents, with reference to rounding and straightening the bar, as also the rest-roll B, but their arrangement relative to each other and to the line of feed differs in the following respects: The axial line of one roll, A, is thrown a little out of horizontal by raising one end a little above and depressing the other a little below the line of feed, and the diagonally-opposite ends of the other roll, A', are similarly raised and depressed above and below the same line of feed, so that the latter shall cut or divide the angle formed by the axis of the two rolls, and preferably at or about midway between the ends of the rolls, but the angle of cut and the point of cut are not material, provided only the latter be between the ends of the rolls.

In the patents above referred to, the lines of bite of the geared working-rolls on the rod or shaft passing through were so low down that through all or the greater part of their length they were below the horizontal radii of the rolls. This resulted from the low position of the rest-roll.

In my present improvement I raise or enlarge the rest-roll so that the line of bite will, at the intersection of the line of feed with the planes of the axes of the rolls, be tangential to the working-faces of the rolls. In order then to keep the rod, bar, or shaft in place, or keep it from working upward out of the desired line of bite, I arrange above it a top bearing-roll, B', made like the lower rest-roll B, and, like it, running free or by frictional contact alone. This roll B' is just as far above the line of feed as the rest-roll B is below it, the relation of the working-faces of all being clearly shown in Fig. 3. These rolls are mounted in suitable housings H H. The working-rolls A A' rest in bearings $a$, adjustable to or from each other in any suitable way, as by wedges $a^1$ raised and lowered by L bolts and nuts $a^2$. The bearing-blocks $b$ of the rest-roll B may be raised and lowered by the usual screw devices or by removable and interchangeable liners $b^1$ of different thicknesses. The bearing-blocks $c$ of the top bearing-roll are also adjustable by the use of screws $c^1$ to lower them, and L or T bolts and nuts $c^2$ to raise them, or by other devices well known in the art. In each housing is an opening, $d$, of suitable size and position for the rod, bar, or shaft to be fed in endwise, pass through the rolls, and be discharged in the line of feed, as above described; and as an aid in guiding the rod, bar, or shaft into the rolls I arrange an end collar, $n$, on each of the free rolls B B' outside the ends of the working-rolls A A'. The machine described may be driven in any convenient way, one such, which on some accounts I believe to be the best, being shown in the drawings. The rolls A A' are, by the usual necks and couplings, coupled to the driving-shafts D' D', which latter are carried in suitable frames, housings, or plummer-blocks D D, and are driven by gearing $g\ g$ from a hollow driving-shaft, G. The hollow $d'$ of this shaft comes in the line of feed through the openings $d$, so that the rod, bar, or shaft to be worked may be fed therein and guided thereby in its passage through the rolls.

The rapid and somewhat irregular rotation of the rod, bar, or shaft, while being worked, will cause it to vibrate and strike against the walls of the hollow guide $d'$ with such force as to be freed from its scale before being worked by the rolls. While it is passing through (it being heated before entering) I keep up a supply of water thereto and thereon by the use of suitable pipes $e$ arranged above the central upper bearing-roll. This water-supply not only keeps the rolls cool, which is its usual purpose, but also chills somewhat the surface of the rod, bar, or shaft, so as, in connection with the scaling and rolling operations described, to give it a better finish and an improved surface, as well as straighten and round it; and after it leaves the rolls thus scaled, rounded, or straightened, and finished, the heat of the central body or inside, radiating outwardly, reheats the surface and gives it a bright-blue tinge, by a chemical or mechanical action somewhat akin to that of annealing.

Instead of the hollow guide $d'$, other suitable guiding device may be employed, which shall hold the rod, bar, or shaft up to the proper level, and which will also project up on either side so as to prevent undue vibration, and secure, by impact thereon, the scaling effect above described.

In the combination of two working rolls and a rest-roll arranged to raise the lines of bite, as described, other suitable devices for keeping the rod, bar, or shaft from rising may be substituted for the top bearing-roll.

I claim herein as my invention—

1. In combination with the grooved and collared rolls A A' B B', the end collars $n\ n$, arranged outside the ends of the working-rolls as a guiding device thereto, substantially as set forth.

2. The hollow guide $d'$, or equivalent guide of like function, as set forth, in combination with a pair of working-rolls, a rest-roll, and a water-supply pipe extending lengthwise of and along the rolls as a means, in connection with the heat of the rod, bar, or shaft, of scaling, finishing, and annealing, substantially as described.

In testimony whereof I have hereunto set my hand.

JOSEPH S. SEAMAN.

Witnesses:
J. J. McCORMICK,
CLAUDIUS L. PARKER.